L. LEE.
AIR HEATING FURNACE.
APPLICATION FILED MAR. 1, 1921.

1,388,583.

Patented Aug. 23, 1921.
5 SHEETS—SHEET 1.

INVENTOR.
Leif Lee
By Bakewell, Byrnes & Parmelee
his Attorneys

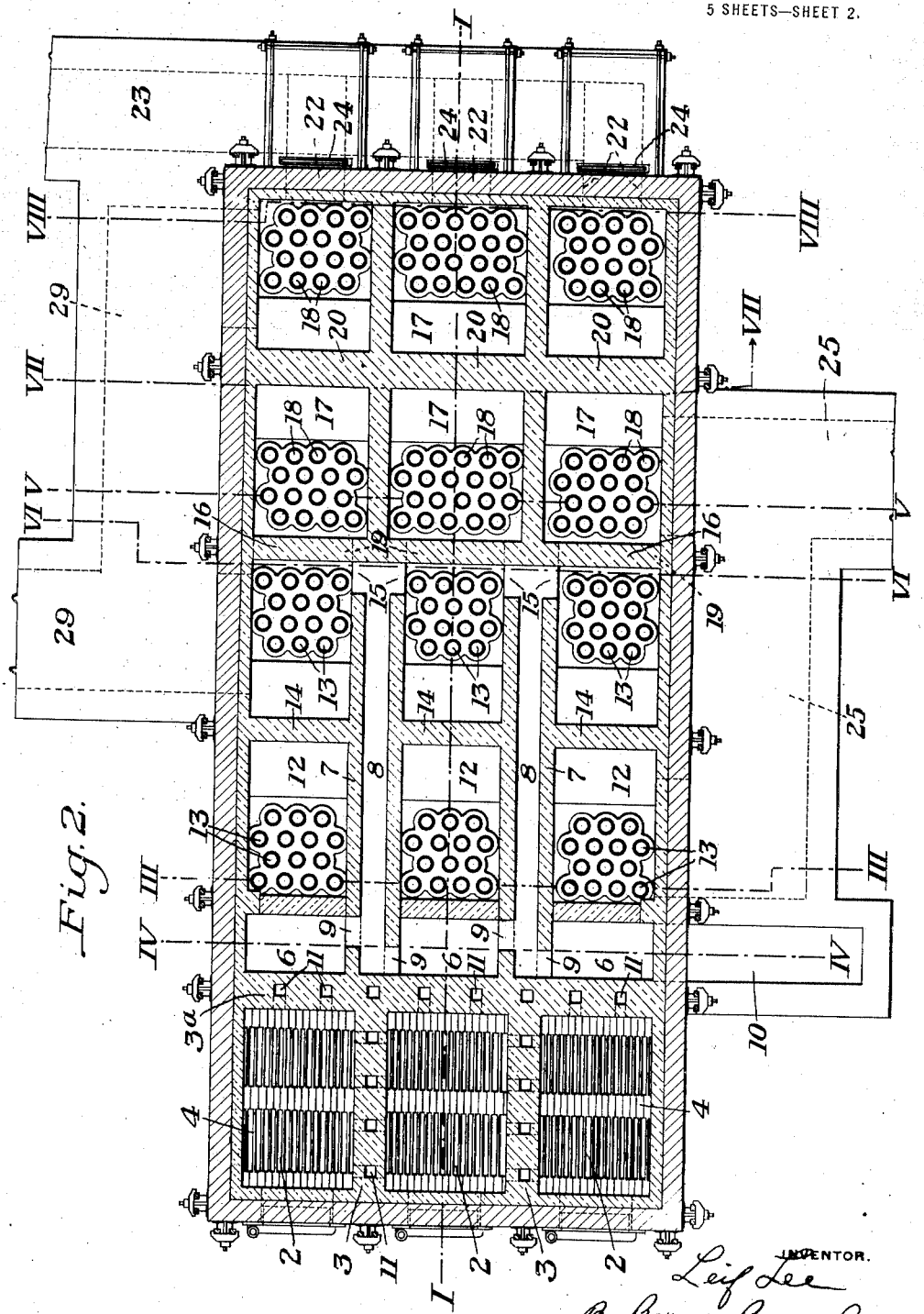

L. LEE.
AIR HEATING FURNACE.
APPLICATION FILED MAR. 1, 1921.
1,388,583.
Patented Aug. 23, 1921.
5 SHEETS—SHEET 3.
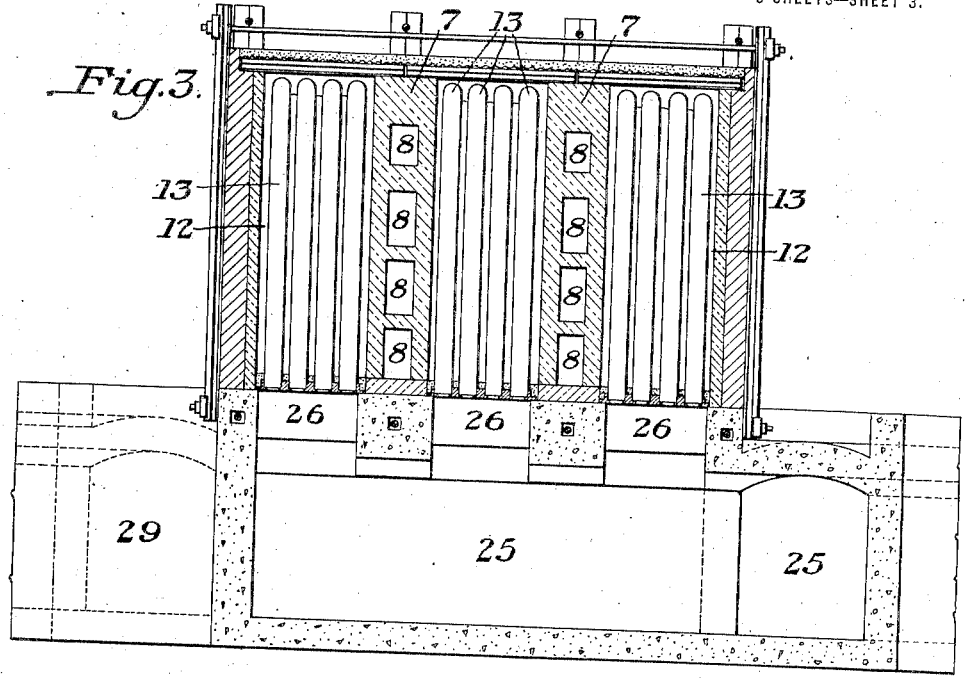
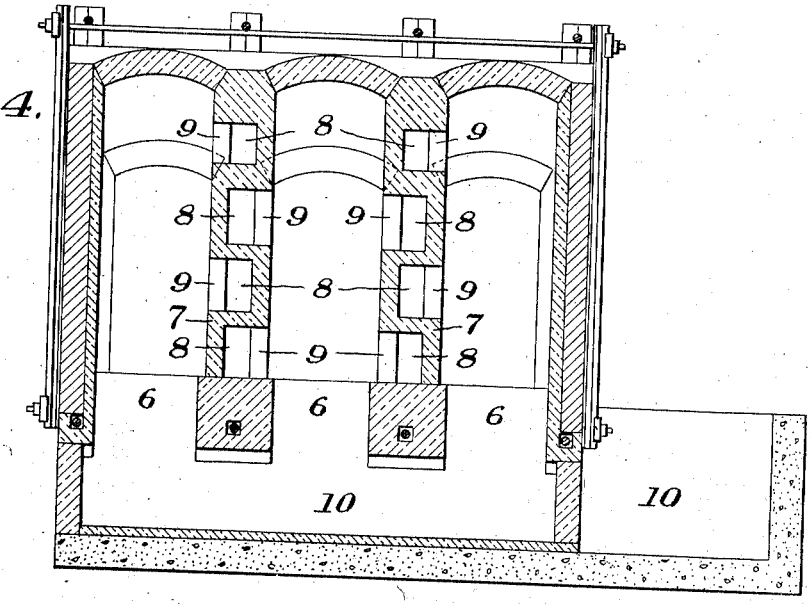

L. LEE.
AIR HEATING FURNACE.
APPLICATION FILED MAR. 1, 1921.
1,388,583.
Patented Aug. 23, 1921.
5 SHEETS—SHEET 4.
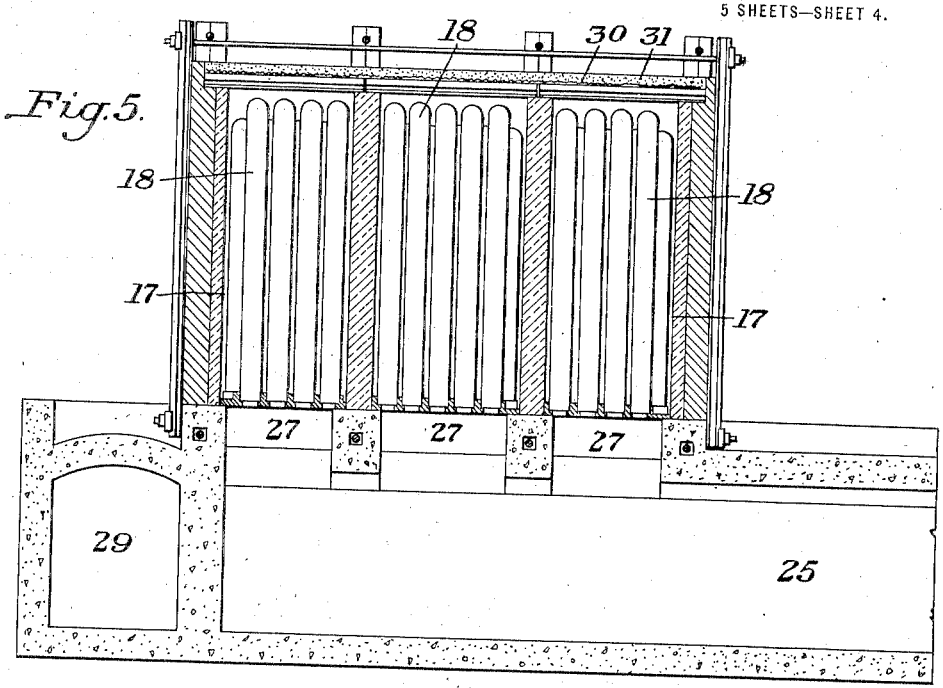
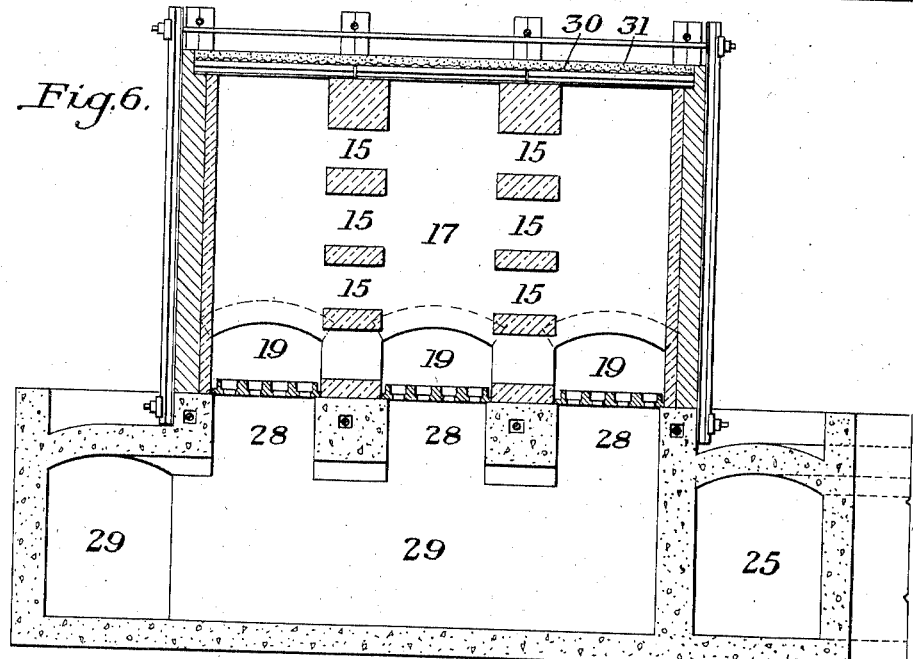

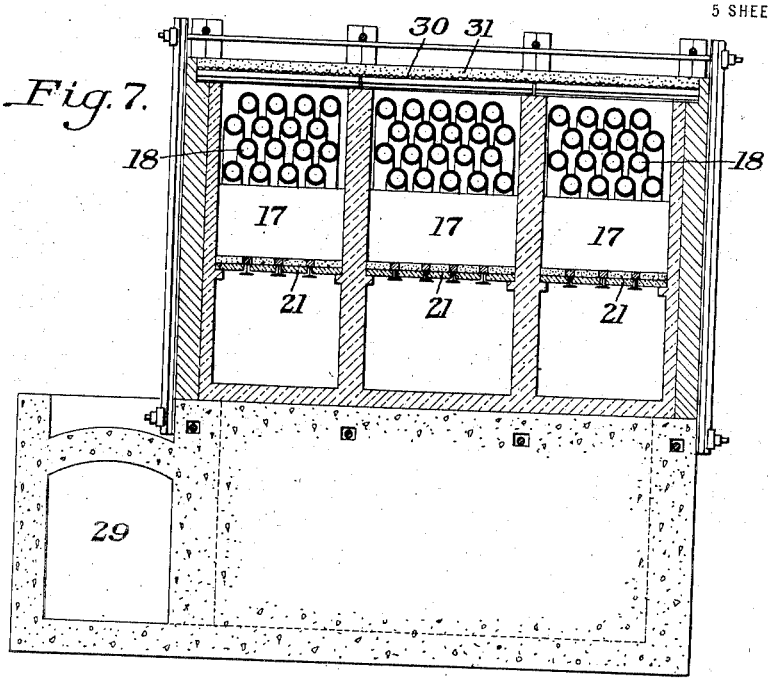
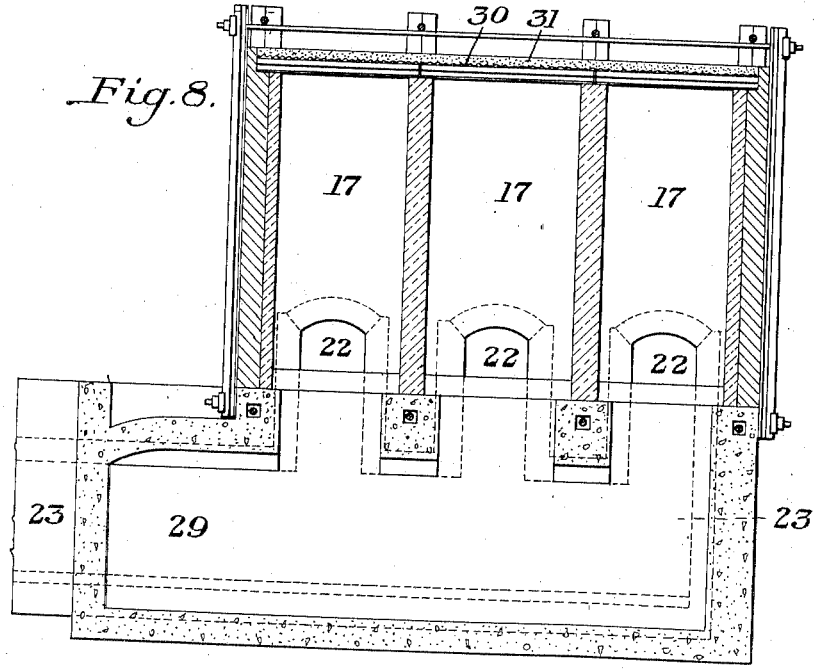

UNITED STATES PATENT OFFICE.

LEIF LEE, OF YOUNGSTOWN, OHIO.

AIR-HEATING FURNACE.

1,388,583.   Specification of Letters Patent.   Patented Aug. 23, 1921.

Application filed March 1, 1921. Serial No. 448,929.

*To all whom it may concern:*

Be it known that I, LEIF LEE, a citizen of the United States, residing at Youngstown, in the county of Mahoning and State of Ohio, have invented a new and useful Improvement in Air-Heating Furnaces, of which the following is a full, clear, and exact description, reference being made to the accompanying drawings, forming part of this specification, in which—

Fig. 2 is a section on the line II—II of Fig. 1, and

Figs. 3, 4, 5, 6, 7 and 8 are transverse sections taken respectively on the lines III—III, IV—IV, V—V, VI—VI, VII—VII and VIII—VIII of Fig. 2.

Figure 1:
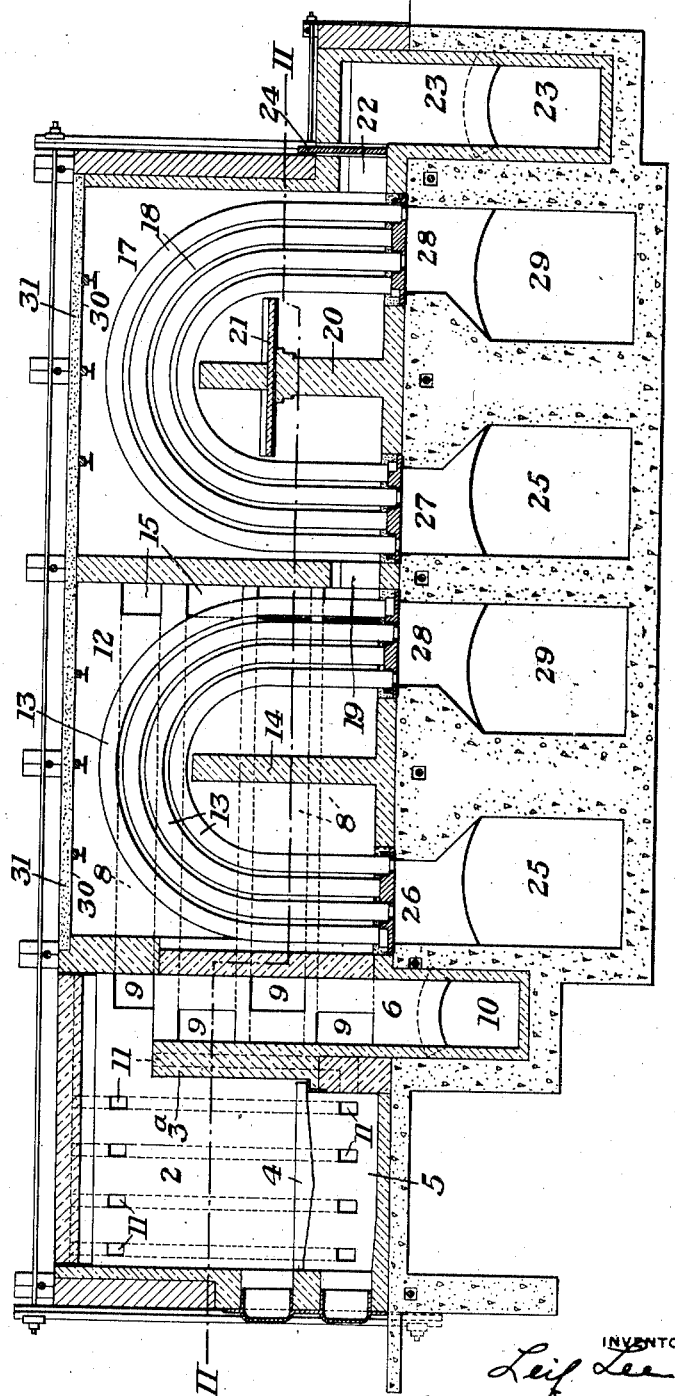
Figure 1 is a longitudinal vertical section of an air heating furnace embodying my invention.

My invention has relation to air heating furnaces, and more particularly to air heating furnaces of the general type described and claimed in my Patent No. 1,319,654 of October 21, 1918.

The object of the present invention is to improve the arrangement of the heating chambers, heating elements and circulating flues whereby a more efficient operation is insured. The invention also provides an improved construction in a number of respects.

The nature of the invention will be best understood by reference to the accompanying drawings in which I have shown a preferred embodiment thereof, and which will now be described, it being premised, however, that various changes may be made in the details of construction, arrangement and combination of the several parts without departing from the spirit and scope of my invention as defined in the accompanying claims.

The preferred furnace, which I have illustrated in the drawings, is what may be termed a "triple furnace" in that there are three combustion chambers and three sets of heating elements arranged in parallel, this being a simple and efficient embodiment of the invention. I desire it to be understood at the outset, however, that my invention is not limited to this construction and that I may employ two, or more than three, combustion chambers and sets of heating elements in parallel, without departing from the spirit and scope of the appended claims.

In the drawings the numeral 2 designates the three combustion chambers which are arranged side by side at one end of the furnace, each combustion chamber being separated from its neighbor or neighbors by a vertical partition wall 3, having its own grate 4 and ash pit 5. It will be obvious, however, that instead of using combustion chambers adapted to burn solid fuel, the construction may be modified for the use of other fuels.

At its upper end each combustion chamber 2 communicates with the upper portion of a vertical downtake flue 6. These downtake flues are separated from each other by vertical partition walls 7 which extend longitudinally of the furnace and form separating partitions for the first set of heating chambers. Each of these walls 7 is provided with a series of longitudinally extending flues 8 therein, these flues communicating at their rear ends with the downtake flues 6 through the openings 9, as best shown in Figs. 1, 2 and 4. 10 designates a clean-out flue into which the downtake flues 6 open at their lower ends. Preferably the partition walls 3 between the combustion chambers and also the transverse partition walls 3ª between the combustion chambers and the flues 6, are provided with a series of vertical openings 11, which, at their lower ends, communicate with the ash pits 5 and which, at their upper ends, open into the upper portions of the combustion chambers. These openings, or ports, serve to conduct cold air from the ash pits into the upper portions of the combustion chambers thereby exerting a cooling effect on the partition walls 3 and 3ª, and also serving to mix relatively cold air with the hot products of combustion, thereby somewhat lowering the temperature of the latter and also increasing the volume of the heating medium. In the operation of a furnace of this character, the hot air used as the heating medium is not required to be of very high temperature but should be of large volume.

12 designates the three heating chambers for the first set of heating elements, these elements consisting of banks or sets of U-shaped pipes or tubes 13 similar to the pipes or tubes shown in my said Patent No. 1,319,654. Each of these heating chambers is partially divided by a transverse partition 14 which extends upwardly centrally within the bank of tubes 13. The longitudinal flues 8 at their forward ends discharge through the openings 15 into the front portions of the chambers 12, at the forward sides of the baffles 14.

16 is a transverse vertical partition wall forming the front wall of all of the chambers 12 and also the front end of the flues 8. Forward of the wall 16 are three other heating chambers 17 arranged in parallel and in endwise arrangement with the respective heating chambers 12. In each chamber 17 is another bank of U-shaped tubes 18 similar to the pipes or tubes 13. The chambers 12 and 17 are connected by the ports 19 (see Figs. 1 and 6), there being one of these ports 19 leading from the lower front portion of each chamber 12 into the lower portion of the adjacent chamber 17. This chamber 17 has a central transverse vertical baffle or partition 20 within the inner tubes of the bank of tubes. Each baffle or partition 20 also carries a longitudinal horizontal baffle 21 to provide for a better circulation of the heating medium.

22 designates outlet ports from the chambers 17 to a stack flue 23. Each of the ports 22 is provided with a suitable regulating damper 24. (See Fig. 1).

The cold air to be heated in the furnace comes in through a flue 25 which extends transversely under the heating chambers 12 and 17, there being ports 26 which lead upwardly from this flue to the rear ends of the pipes or tubes 13; and also ports or openings 27 which lead upwardly therefrom to the lower end portions of the rear legs of the pipes or tubes 18. (See Figs. 1, 2, 3 and 5).

The heated air from the opposite ends of said tubes 13 and 18 is discharged through the ports 28 into an off-take flue 29.

The roofs of the heating chambers 12 and 17 are preferably made removable so as to permit ready access to the heating chambers for the renewal or repair of the pipes or tubes when necessary. For this purpose these roofs may consist of plates 30 of sheet metal having a covering 31 of sand or other similar material, said plates being readily removable.

The operation is as follows:—The products of combustion, mixed with cold air from the openings or passages 11 pass into the downtake flue 6 and thence into the longitudinal flues 8 in the partition walls 7. From the flues 8 the products of combustion pass into the front portions of the heating chambers 12 and circulate around the front legs of the pipes or tubes 13. From the chambers 12 the products of combustion pass through the ports 19 into the heating chambers 17 where they are circulated around the entire banks of tubes in these chambers and then escape through the ports 22 to the stack flue 23. It will be noted that the products of combustion, which at this time are at their maximum temperature, do not come into contact with the rear legs of the pipes or tubes 13, but that the rear portions of the heating chambers 12 constitute, in fact, muffles, which are heated solely by conduction through the walls 7. In this manner the products of combustion are prevented from contacting with the pipes or tubes when the former are at a temperature sufficiently high to be liable to burn the pipes or tubes. By the time the products of combustion reach the forward portion of the chambers 12 their temperature has been reduced sufficiently that they may be safely brought into direct contact with the pipes or tubes.

The advantages of my invention will be apparent to those familiar with this art since it provides a furnace capable of heating large volumes of air in an economical and efficient manner, the construction being such as to obtain a maximum heating action from the products of combustion before the latter are discharged into the stack. It will be noted that the heating pipes 13 and 18 are held at their ends only and owing to their shape are free to expand or contract without injury thereto. These tubes provide a maximum area of heating surface, and also split the volume of cold air to be heated into relatively small volumes which may be more effectively heated.

I claim:

1. An air heating furnace, comprising a pair of combustion chambers arranged side by side, a pair of heating chambers located side by side in front of the combustion chambers, a longitudinally extending partition wall intermediate the combustion chambers, said wall having a plurality of flues therein arranged one above another, flues intermediate the combustion chambers and the heating chambers and with which the flues in the partition wall communicate, and a plurality of air heating pipes or tubes arranged in each of the air heating chambers, said flues communicating with the forward portions only of the heating chambers, and there being baffle means to prevent entrance of the products of combustion to the rear portions of said chambers, substantially as described.

2. An air heating furnace, comprising a pair of combustion chambers arranged side by side, a pair of heating chambers located side by side in front of the combustion chambers, a longitudinally extending partition wall intermediate the combustion chambers, said wall having a plurality of flues therein arranged one above another, flues intermediate the combustion chambers and the heating chambers and with which the flues in the partition wall communicate, and a plurality of air heating pipes or tubes arranged in each of the heating chambers, said flues communicating with the forward portions only of the heating chambers, and there being baffle means to prevent entrance of the products of combustion to the rear portions of said chambers, together with another pair of heating chambers arranged in front of the chambers of the first named pair, and means for causing the products of combustion discharged from the first named heating chambers to circulate through the second pair of heating chambers, and air heating elements arranged in the chambers of the second pair, substantially as described.

3. An air heating furnace, comprising a pair of combustion chambers arranged side by side, a downtake flue in front of each combustion chamber and communicating at its upper end with the upper portion of the corresponding combustion chamber, a heating chamber located in front of each of the downtake flues, a partition wall separating the heating chambers and having longitudinally extending flues therein which communicate with the downtake flues and also with the forward portions of the heating chambers, and a bank of U-shaped air heating pipes or tubes arranged in each of said heating chambers, substantially as described.

4. An air heating furnace, comprising a pair of combustion chambers arranged side by side, a downtake flue in front of each combustion chamber and communicating at its upper end with the upper portion of the corresponding combustion chamber, a heating chamber located in front of each of the downtake flues, a partition wall separating the heating chambers and having longitudinally extending flues therein which communicate with the downtake flues and also with the forward portions of the heating chambers, and a bank of U-shaped air heating pipes or tubes arranged in each of said heating chambers, together with means in said chambers for preventing the products f combustion discharged from said flues .rom passing into the rear portions of said heating chamber, substantially as described.

5. An air heating furnace, comprising a pair of combustion chambers arranged side by side, a downtake flue in front of each combustion chamber and communicating at its upper end with the upper portion of the corresponding combustion chamber, a heating chamber located in front of each of the downtake flues, a partition wall separating the heating chambers and having longitudinally extending flues therein which communicate with the downtake flues and also with the forward portions of the heating chambers, a bank of U-shaped air heating pipes or tubes arranged in each of said heating chambers, together with other heating chambers arranged to receive the products of combustion discharged from the first named heating chambers, and banks of air heating pipes or tubes arranged in the last named heating chambers, substantially as described.

6. An air heating furnace, comprising a pair of combustion chambers arranged side by side, a downtake flue in front of each combustion chamber and communicating at its upper end with the upper portion of the corresponding combustion chamber, a heating chamber located in front of each of the downtake flues, a partition wall separating the heating chambers and having longitudinally extending flues therein which communicate with the downtake flues and also with the forward portions of the heating chambers, and a bank of U-shaped air heating pipes or tubes arranged in each of said heating chambers, together with cold air inlet flues communicating with the U-shaped pipes or tubes at one end and hot air outlet flues communicating with the U-shaped tubes or pipes at their other ends, substantially as described.

7. An air heating furnace, comprising a pair of combustion chambers arranged side by side, a downtake flue in front of each combustion chamber and communicating at its upper end with the upper portion of the corresponding combustion chamber, a heating chamber located in front of each of the downtake flues, a partition wall separating the heating chambers and having longitudinally extending flues therein which communicate with the downtake flues and also with the forward portions of the heating chambers, a bank of U-shaped air heating pipes or tubes arranged in each of said heating chambers, together with other heating chambers arranged to receive the products of combustion discharged from the first named heating chambers, and banks of air heating pipes or tubes arranged in the last named heating chambers, together with cold air supply flues communicating with one end of each of the said pipes or tubes and hot air offtake flues communicating with the opposite ends of said pipes or tubes, substantially as described.

8. An air heating furnace, comprising a plurality of combustion chambers arranged side by side, a vertical downtake flue in front of each combustion chamber and communicating at its upper end with the upper portion of the combustion chamber, a heating chamber arranged in front of each downtake flue, partition walls separating the downtake flues and the heating chambers, said walls having a plurality of flues therein arranged one above another, said flues each communicating at one end with the downtake flues and at their opposite ends with the heating chambers, a plurality of air heating elements in each of said heating chambers, and removable roof portions for said heating chambers to provide access to the heating elements, substantially as described.

9. An air heating furnace, comprising a plurality of combustion chambers arranged side by side, a vertical downtake flue in front of each combustion chamber and communicating at its upper end with the upper portion of the combustion chamber, a heating chamber arranged in front of each downtake flue, partition walls separating the downtake flues and the heating chambers, said walls having a plurality of flues therein arranged one above another, said flues each communicating at one end with the downtake flues and at their opposite ends with the heating chambers, a plurality of air heating elements in each of said heating chambers, other heating chambers arranged in front of the first named heating chambers, means for circulating through said other heating chambers the products of combustion discharged from the first named heating chambers, and a bank of air heating elements arranged in each of the other heating chambers, said heating chambers having removable roofs to permit access to the heating elements, substantially as described.

In testimony whereof I have hereunto set my hand.

LEIF LEE.